(12) United States Patent
Kim et al.

(10) Patent No.: US 11,637,487 B2
(45) Date of Patent: Apr. 25, 2023

(54) MOTOR ASSEMBLY AND MANUFACTURING METHOD THEREOF

(71) Applicant: LG Electronics Inc., Seoul (KR)

(72) Inventors: Sunggi Kim, Seoul (KR); Byungjik Kim, Seoul (KR); Eunji Hwang, Seoul (KR); Jisu Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 503 days.

(21) Appl. No.: 16/821,431

(22) Filed: Mar. 17, 2020

(65) Prior Publication Data

US 2020/0403488 A1    Dec. 24, 2020

(30) Foreign Application Priority Data

Jun. 21, 2019  (KR) .................. 10-2019-0074019

(51) Int. Cl.
*H02K 15/16* (2006.01)
*F16C 41/02* (2006.01)
(Continued)

(52) U.S. Cl.
CPC ............. *H02K 15/16* (2013.01); *F16C 41/02* (2013.01); *F16C 43/045* (2013.01); *H02K 15/02* (2013.01);
(Continued)

(58) Field of Classification Search
CPC ........ H02K 15/16; H02K 15/02; H02K 5/163; H02K 5/165; H02K 7/14; F16C 41/02; F16C 43/045
(Continued)

(56) References Cited

U.S. PATENT DOCUMENTS 3,132,594 A    5/1964  Shiley et al.
8,807,967 B2 *  8/2014  Takeshita ............... H02K 1/185
                                                417/423.12
(Continued)

FOREIGN PATENT DOCUMENTS

AT         509333        8/2011
DE      102012223012     6/2014
(Continued)

OTHER PUBLICATIONS

Australian Office Action in Australian Application No. 2020203472, dated Nov. 18, 2020, 7 pages.
(Continued)

*Primary Examiner* — Terrance L Kenerly
(74) *Attorney, Agent, or Firm* — Fish & Richardson P.C.

(57) ABSTRACT

A motor assembly includes a first bearing installed on a rotating shaft adjacent to an impeller to support a first support part of the rotating shaft, a second bearing installed on the rotating shaft adjacent to the rotor to support a second support part of the rotating shaft, a bearing bracket receiving the first and second bearings therein, an elastic member inserted between the first bearing and the bearing bracket or between the second bearing and the bearing bracket to press either the first bearing or the second bearing to get closer to each other, and a separation preventing member installed on the bearing bracket to fix the first bearing, the second bearing and the elastic member to an inner space of the bearing bracket such that at least one portion of the separation preventing member overlaps with one of the first bearing, the second bearing and the elastic member.

19 Claims, 22 Drawing Sheets

(51) Int. Cl.
*F16C 43/04* (2006.01)
*H02K 15/02* (2006.01)
*H02K 5/16* (2006.01)
*H02K 7/14* (2006.01)

(52) U.S. Cl.
CPC ............. *H02K 5/163* (2013.01); *H02K 5/165* (2013.01); *H02K 7/14* (2013.01)

(58) Field of Classification Search
USPC .......................................................... 310/90
See application file for complete search history.

(56) References Cited

U.S. PATENT DOCUMENTS

| | | |
|---|---|---|
| 2014/0125208 A1 | 5/2014 | Yamashita et al. |
| 2015/0076972 A1 | 3/2015 | Leiber et al. |
| 2015/0333592 A1 | 11/2015 | Yin et al. |

FOREIGN PATENT DOCUMENTS

| | | |
|---|---|---|
| JP | 2017106527 | 6/2017 |
| KR | 1020100030177 | 3/2010 |
| KR | 1020110112865 | 10/2011 |
| KR | 1020130129228 | 11/2013 |
| KR | 101852111 | 4/2018 |
| KR | 101898348 | 9/2018 |
| TW | 201907851 | 3/2019 |
| WO | WO2007111032 | 10/2007 |
| WO | WO2019065929 | 4/2017 |

OTHER PUBLICATIONS

Extended European Search Report in European Application No. 20178398.2, dated Nov. 9, 2020, 8 pages.

TW Office Action in Taiwanese Appln. No. 109116748, dated May 11, 2021, 20 pages (with English translation).

* cited by examiner

MOTOR ASSEMBLY AND MANUFACTURING METHOD THEREOF

CROSS-REFERENCE TO RELATED APPLICATIONS

This application claims the benefit of the Korean Patent Application No. 10-2019-0074019, filed on Jun. 21, 2019, which is hereby incorporated by reference as if fully set forth herein.

BACKGROUND OF THE DISCLOSURE

Field of the Disclosure

The present disclosure relates to a motor assembly and manufacturing method thereof, and more particularly, to a motor assembly having a bearing supporting a rotating shaft and manufacturing method thereof.

Discussion of the Related Art

A motor is installed in a home appliance such as a vacuum cleaner, a hair dryer and the like so as to function as a drive source that generates a rotational force. The motor may be coupled to a fan. In this case, a rotational force of the motor may be transferred to the fan to generate airflow depending on the fan's rotation.

For example, as the above-mentioned vacuum cleaner or hair dryer operates in a manner of being directly lifted up with a user's hand, it is needless to say that the core value of recent engineering lies in that the vacuum cleaner or hair dryer is manufactured to have lighter weight and smaller volume, provided that the necessary functions are improved or at least kept the same.

In addition to vacuum cleaners and hair dryers, it is generally necessary to improve or at least maintain unique functions in designing and manufacturing home appliances, while at the same time lightening and downsizing them. This is to maximize user convenience, which must be taken into account in order to ensure differentiation from competing products in a highly competitive market.

For one example, a vacuum cleaner is required to increase the output power of a motor while also making the motor smaller and lighter. To this end, high speed rotation of the motor is essential. However, the high-speed rotation of the motor inevitably causes noise and vibration problems.

Motors of the related art are equipped with two bearings to support a rotating shaft that rotates at high speed. And, one roll bearing is generally installed in each of both directions around a rotor and a stator, or one gas bearing is generally installed in each of both directions around a rotor and a stator.

Thus, in such a structure that two bearings support distant parts of a rotating shaft, there exists a problem that failure to correctly align a rotation center of the rotating shaft will not only deepen the noise and vibration, but also shorten the life of the motor.

In addition, since two bearing brackets respectively receiving two bearings therein need to be provided, the overall weight of a motor assembly is increased while a space for the bearings and the bearing brackets to be installed therein is also needed additionally to reflect the latest trend that requires the downsizing and weight-lightening of a motor. Since the bearing brackets are processed on different parts, respectively, the misalignment between two housings due to an assembly tolerance, a processing tolerance and the like is inevitable.

Therefore, in order to achieve small-scale light weighting of a motor while ensuring reliability and durability of the motor in response to the noise and vibration problems caused by the poor alignment, it is essential to design bearings capable of supporting a rotating shaft of the motor that rotates at high speed without distortion or breakage for as long as possible.

SUMMARY OF THE DISCLOSURE

Accordingly, the present disclosure is directed to a motor assembly and manufacturing method thereof that substantially obviate one or more problems due to limitations and disadvantages of the related art.

One object of the present disclosure is to provide a motor assembly and manufacturing method thereof, by which reliability and durability of the motor assembly may be obtained in supporting a rotating shaft of a motor that rotates at high speed while satisfying the requirements for downsizing and weight-lightening the motor assembly installed at a home appliance.

Another object of the present disclosure is to provide a motor assembly and manufacturing method thereof, by which noise and vibration may be reduced by improving the alignment between two bearings.

Further object of the present disclosure is to provide a motor assembly and manufacturing method thereof, by which the structure of the motor assembly may be simplified in a manner of reducing the number of bearing brackets for receiving two bearings therein.

Another further object of the present disclosure is to provide a motor assembly and manufacturing method thereof, by which the downsizing and weight-lightening of the motor assembly may be implemented while securing the sufficient bearing life by enlarging a size of a bearing.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To solve the above problems, a motor assembly and manufacturing method thereof according to embodiments of the present disclosure are technically characterized in applying an appropriate pre-load to bearings while eccentrically supporting a rotating shaft with two bearings.

Particularly, the present disclosure is technically characterized in applying pre-load to bearings in a manner of having two bearings received in a single bearing bracket, disposing the two bearings to be spaced apart from each other in a prescribed spacing along an axial direction of a rotating shaft, pressurizing one bearing in a direction that the two bearings get closer to each other, attaching the directly pressurized bearing to the bearing bracket with an adhesive agent, and fixing the indirectly pressurized bearing to the bearing bracket by press fitting.

In addition, the two bearings are technically characterized in having an outer diameter greater than an inner diameter of a stator.

To achieve these objects and other advantages and in accordance with the purpose of the disclosure, particular embodiments described herein include a motor assembly that includes a rotating shaft, an impeller, a rotor, a stator, a first bearing, a second bearing, a bearing bracket, an elastic member, and a separation preventing holder. The impeller may be mounted on the rotating shaft. The rotor may be mounted on the rotating shaft and axially spaced apart from the impeller along a rotational axis of the rotating shaft. The stator may surround a circumferential surface of the rotor and be spaced apart from the rotor radially relative to the rotational axis of the rotating shaft. The first bearing may be mounted on the rotating shaft between the impeller and the rotor and configured to rotatably support a first support part of the rotating shaft. The second bearing may be mounted on the rotating shaft between the impeller and the rotor and configured to rotatably support a second support part of the rotating shaft. The first bearing may be positioned closer to the impeller than the second bearing. The second bearing may be positioned closer to the rotor than the first bearing. The bearing bracket may receive the first and second bearings therein. The elastic member may be disposed between the first bearing and the bearing bracket or between the second bearing and the bearing bracket and may bias one of the first bearing and the second bearing toward the other of the first beating and the second bearing. The separation preventing holder may be mounted on the bearing bracket and fix the first bearing, the second bearing and the elastic member within the bearing bracket such that at least a portion of the separation preventing holder covers at least one of the first bearing, the second bearing or the elastic member axially along the rotational axis of the rotating shaft.

In some implementations, the motor assembly can optionally include one or more of the following features. The separation preventing holder may be mounted on the bearing bracket and enclose an outer circumference of the bearing bracket. The bearing bracket may include an installation groove recessed from an inner circumference of the bearing bracket. The separation preventing holder may be elastically deformable by an externally applied force. The separation preventing holder may be engaged with the installation groove while the separation preventing holder is deformed. The separation preventing holder may have a diameter equal to or smaller than a diameter of the inner circumference of the bearing bracket. An outer diameter of each of the first and second bearings may be greater than an inner diameter of the stator. The first bearing may include a first inner ring press-fit onto the first support part of the rotating shaft, a first outer ring contacting with an inner surface of the bearing bracket, and a first roll member disposed between the first inner ring and the first outer ring and rotatably support the first inner ring relative to the first outer ring. The second bearing may include a second inner ring press-fit onto the second support part of the rotating shaft, a second outer ring contacting with the inner surface of the bearing bracket, and a second roll member disposed between the second inner ring and the second outer ring and rotatably supporting the second inner ring relative to the second outer ring. One of the first outer ring and the second outer ring may be press-fit onto the inner surface of the bearing bracket, and the other may be attached to the inner surface of the bearing bracket by an adhesive. The first roll member may be configured to maintain contact with the first inner ring and the first outer ring based on the elastic member biasing one of the first outer ring and the second outer ring. The second roll member may be configured to maintain contact with the second inner ring and the second outer ring based on the elastic member biasing the one of the first outer ring and the second outer ring.

Particular embodiments described herein include a method of manufacturing a motor assembly. The method may include mounting a first bearing on a rotating shaft; mounting a second bearing on the rotating shaft; inserting an elastic member in a bearing bracket; inserting the rotating shaft having the first and second bearing mounted thereon in the bearing bracket such that the rotating shaft extends through the bearing bracket, the first and second bearings are seated on the bearing bracket, and the second bearing contacts with the elastic member; and mounting a separation preventing holder on the bearing bracket such that at least a portion of the separation preventing holder covers the first bearing axially along a rotational axis of the rotating shaft. The elastic member may be inserted between the second bearing and the bearing bracket to bias the second bearing toward the first bearing.

In some implementations, the system can optionally include one or more of the following features. Mounting the separation preventing holder on the bearing bracket may include mounting the separation preventing holder on the bearing bracket to enclose an outer circumference of the bearing bracket. The bearing bracket may include an installation groove recessed from an inner circumference of the bearing bracket. The separation preventing holder may be elastically deformable by an externally applied force. The method may include engaging the separation preventing holder with the installation groove while the separation preventing holder is deformed. The first bearing may include a first inner ring and the second bearing includes a second inner ring. The method may include press-fitting the first inner ring onto a first support part of the rotating shaft, and press-fitting the second inner ring onto a second support part of the rotating shaft. The first bearing may include a first outer ring, and the second bearing includes a second inner ring. The method may include press-fitting the first outer ring onto an inner surface of the bearing bracket, and attaching the second outer ring to the inner surface of the bearing bracket by an adhesive agent. Upon the elastic member biasing the second outer ring toward the first outer ring, the second outer ring of the second bearing may be axially slidable along the inner surface of the bearing bracket during a predetermined time after the second outer ring is attached to the inner surface of the bearing bracket by the adhesive agent. After expiration of the predetermined time, the second outer ring may be fixed to the inner surface of the bearing bracket.

Particular embodiments described herein include a method of manufacturing a motor assembly. The method may include mounting a first bearing on a rotating shaft; mounting a second bearing on the rotating shaft; inserting the rotating shaft having the first and second bearing installed thereon in a bearing bracket such that the rotating shaft extends through the bearing bracket and the first and second bearings are seated on the bearing bracket; inserting an elastic member in the bearing bracket such that the first bearing contacts with the elastic member; and mounting a separation preventing holder on the bearing bracket such that at least a portion of the separation preventing holder covers the elastic member axially along a rotational axis of the rotating shaft.

In some implementations, the method can optionally include one or more of the following features. The separation preventing holder may be installed on the bearing bracket to enclose an outer circumference of the bearing bracket. The bearing bracket may include an installation groove recessed from an inner circumference of the bearing bracket. The separation preventing holder may be elastically deformable by an externally applied force. The method may include engaging the separation preventing holder with the installation groove while the separation preventing holder is deformed. Inserting an elastic member in the bearing bracket may include inserting the elastic member between the first bearing and the separation preventing holder to bias the first bearing toward the second bearing. The first bearing may include a first outer ring, and the second bearing may include a second outer ring. The method may include attaching the first outer ring to an inner surface of the bearing bracket by an adhesive agent; and press-fitting the second outer ring to the inner surface of the bearing bracket. Upon the elastic member biasing the first outer ring toward the second outer ring, the first outer ring of the first bearing may be axially slidable along the inner surface of the bearing bracket during a predetermined time after the first outer ring is attached to the inner surface of the bearing bracket by the adhesive agent. After expiration of the predetermined time, the first outer ring may be fixed to the inner surface of the bearing bracket.

To achieve these objects and other advantages and in accordance with the purpose of the disclosure, as embodied and broadly described herein, a motor assembly according to one embodiment of the present disclosure may include a rotating shaft, an impeller installed on the rotating shaft, a rotor installed on the rotating shaft to be spaced apart from the impeller in a prescribed distance along an axial direction of the rotating shaft, a stator enclosing an outside of the rotor in a manner of being spaced apart from the rotor in a prescribed distance along a radial direction of the rotating shaft, a first bearing installed on the rotating shaft in a manner of being installed adjacent to the impeller between the impeller and the rotor to support a first support part of the rotating shaft, a second bearing installed on the rotating shaft in a manner of being installed adjacent to the rotor between the impeller and the rotor to support a second support part of the rotating shaft, a bearing bracket receiving the first and second bearings therein, an elastic member inserted between the first bearing and the bearing bracket or between the second bearing and the bearing bracket to pressurize either the first bearing or the second bearing in a direction for the first and second bearings to get closer to each other, and a separation preventing member installed on the bearing bracket to fix the first bearing, the second bearing and the elastic member to an inner space of the bearing bracket in a manner that at least one portion of the separation preventing member overlaps with one of the first bearing, the second bearing and the elastic member with reference to the axial direction of the rotating shaft.

The separation preventing member may be installed on the bearing bracket to enclose an outer circumference of the bearing bracket.

The bearing bracket may further include an installation groove recessed from an inner circumference of the bearing bracket along a radial direction of the rotating shaft, the separation preventing member may be elastically deformable between a compressed state of being compressed by an externally applied force and a normal state expanding from the compressed state according to a removal of the externally applied force, and the separation preventing member may be installed in the installation groove while the compressed state is maintained.

The separation preventing member may have a diameter substantially corresponding to or smaller than that of the inner circumference of the bearing bracket.

An outer diameter of each of the first and second bearings may be greater than an inner diameter of the stator.

The first bearing may include a first inner ring fixed to an outer circumference of the first support part of the rotating shaft by press fitting, a first outer ring contacting with an inner surface of the bearing bracket, and a first roll member inserted between the first inner ring and the first outer ring to support a relative rotational motion of the first inner ring to the first outer ring, and the second bearing may include a second inner ring fixed to an outer circumference of the second support part of the rotating shaft by press fitting, a second outer ring contacting with the inner surface of the bearing bracket, and a second roll member inserted between the second inner ring and the second outer ring to support a relative rotational motion of the second inner ring to the second outer ring.

One of the first outer ring and the second outer ring may be fixed to the inner surface of the bearing bracket by the press fitting and the other may be fixed to the inner surface of the bearing bracket through an adhesive member.

The other one of the first outer ring and the second outer ring may be slidable in a prescribed distance toward an axial direction of the rotating shaft along the inner surface of the bearing bracket during a prescribed time right after the other one of the first outer ring and the second outer ring has been attached to the inner surface of the bearing bracket through the adhesive agent. After expiration of the prescribed time, the other one of the first outer ring and the second outer ring may be fixed to the inner surface of the bearing bracket as the adhesive agent is fixed.

The elastic member may pressurize one of the first outer ring and the second outer ring toward the other, one of the first roll member and the second roll member may receive a pressurizing force of the elastic member from one of the first outer ring and the second outer ring and then deliver it to one of the first inner ring and the second inner ring, the rotating shaft may be moved in a direction of the pressurizing force delivered to one of the first inner ring and the second inner ring while the other is moved together with the rotating shaft, the other one of the first inner ring and the second inner ring may deliver the pressurizing force to the other one of the first roll member and the second roll member, and the other one of the first roll member and the second roll member may deliver the pressurizing force received from the other one of the first inner ring and the second inner ring to the other one of the first outer ring and the second outer ring.

And, as the elastic member pressurizes one of the first outer ring and the second outer ring toward the other, the first roll member may maintain a state of substantially contacting with the first inner ring and the first outer ring and the second roll member may maintain a state of substantially contacting with the second inner ring and the second outer ring.

In another aspect of the present disclosure, a method of manufacturing a motor assembly according to another embodiment of the present disclosure may include installing a first bearing and a second bearing on a rotating shaft, inserting an elastic member in a bearing bracket, inserting the rotating shaft having the first and second bearing installed thereon in the bearing bracket so as to perforate the bearing bracket and seating the first and second bearings on the bearing bracket so as to enable the second bearing and the elastic member to contact with each other, and installing a separation preventing member on the bearing bracket in a manner that at least one portion of the separation preventing member overlaps with the first bearing with reference to an axial direction of the rotating shaft, wherein the elastic member may be inserted between the second bearing and the bearing bracket to pressurize the second bearing in a direction for the first and second bearings to get closer to each other.

The separation preventing member may be installed on the bearing bracket to enclose an outer circumference of the bearing bracket.

The bearing bracket may further include an installation groove recessed from an inner circumference of the bearing bracket along a radial direction of the rotating shaft, the separation preventing member may be elastically deformable between a compressed state of being compressed by an externally applied force and a normal state expanding from the compressed state according to a removal of the externally applied force, and the separation preventing member may be installed in the installation groove while the compressed state is maintained.

A first inner ring of the first bearing may be fixed to a first support part of the rotating shaft by press fitting and a second inner ring of the second bearing may be fixed to a second support part of the rotating shaft by press fitting A first outer ring of the first bearing may be fixed to an inner surface of the bearing bracket by press fitting and a second outer ring of the second bearing may be fixed to the inner surface of the bearing bracket through an adhesive agent.

As the elastic member pressurizes the second outer ring toward the first outer ring, the second outer ring of the second bearing may be slidable in a prescribed distance toward an axial direction of the rotating shaft along the inner surface of the bearing bracket during a prescribed time right after the second outer ring has been attached to the inner surface of the bearing bracket through the adhesive agent, and after expiration of the prescribed time, the second outer ring may be fixed to the inner surface of the bearing bracket.

In further aspect of the present disclosure, a method of method of manufacturing a motor assembly according to another embodiment of the present disclosure may include installing a first bearing and a second bearing on a rotating shaft, inserting the rotating shaft having the first and second bearing installed thereon in a bearing bracket so as to perforate the bearing bracket and seating the first and second bearings on the bearing bracket, inserting an elastic member in the bearing bracket to enable the first bearing and the elastic member to contact with each other, and installing a separation preventing member on the bearing bracket in a manner that at least one portion of the separation preventing member overlaps with the elastic member with reference to an axial direction of the rotating shaft.

The separation preventing member may be installed on the bearing bracket to enclose an outer circumference of the bearing bracket.

The bearing bracket further may include an installation groove recessed in a prescribed interval from an inner circumference of the bearing bracket along a radial direction of the rotating shaft, the separation preventing member may be elastically deformable between a compressed state of being compressed by an externally applied force and a normal state expanding from the compressed state according to a removal of the externally applied force, and the separation preventing member may be installed in the installation groove while the compressed state is maintained.

The elastic member may be inserted between the first bearing and the separation preventing member so as to pressurize the first bearing in a direction for the first and second bearings to get closer to each other.

A first inner ring of the first bearing may be fixed to a first support part of the rotating shaft by press fitting and wherein a second inner ring of the second bearing may be fixed to a second support part of the rotating shaft by press fitting.

A first outer ring of the first bearing may be fixed to an inner surface of the bearing bracket through an adhesive agent and a second outer ring of the second bearing may be fixed to the inner surface of the bearing bracket by press fitting.

As the elastic member pressurizes the first outer ring toward the second outer ring, the first outer ring of the first bearing may be slidable in a prescribed distance toward an axial direction of the rotating shaft along the inner surface of the bearing bracket during a prescribed time right after the first outer ring has been attached to the inner surface of the bearing bracket through the adhesive agent, and after expiration of the prescribed time, the first outer ring may be fixed to the inner surface of the bearing bracket.

Accordingly, a motor assembly and manufacturing method thereof according to the preset disclosure provide the following effects and/or advantages.

Firstly, the downsizing and weight-lightening of a motor assembly may be implemented by applying appropriate pre-load to bearings while eccentrically supporting a rotating shaft with two bearings, and noise and vibration may be reduced by improving alignment between the two bearings.

Secondly, as two bearings are received in a single bearing bracket in a manner of being spaced apart from each other in a prescribed spacing along an axial direction of a rotating shaft, an overall structure of the motor assembly may be simplified. Simultaneously, as the rotating shaft can be stably supported, reliability and durability of the bearing structure may be secured.

Thirdly, as each of two bearings eccentrically supporting a rotating shaft has an outer diameter greater than an inner diameter of a stator, sufficient bearing life may be secure by increasing sizes of the bearings.

Further scope of applicability of the present disclosure will become apparent from the detailed description given hereinafter. However, it should be understood that the detailed description and specific examples, while indicating preferred embodiments of the disclosure, are given by illustration only, since various changes and modifications within the spirit and scope of the disclosure will become apparent to those skilled in the art from this detailed description.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure, and reference numerals refer to structural elements. In the drawings.

DETAILED DESCRIPTION OF THE DISCLOSURE

Figure 1:
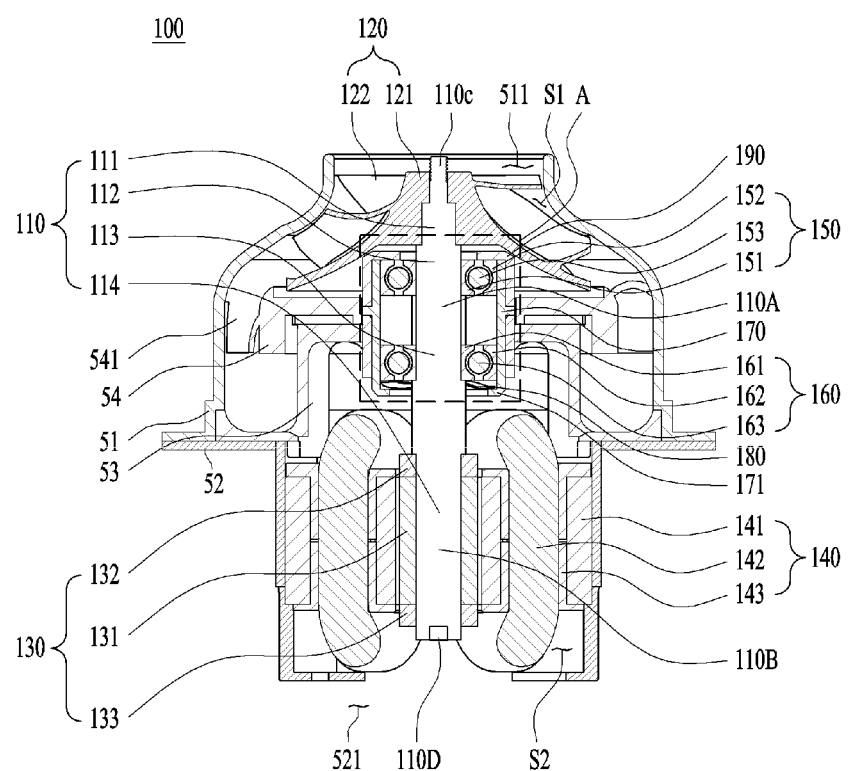
FIG. 1 is a cross-sectional diagram showing each configuration of a motor assembly according to one embodiment of the present disclosure.

Although the terms used in the present disclosure are selected from generally known and used terms, terms used herein may be varied depending on operator's intention or customs in the art, appearance of new technology, or the like. In addition, some of the terms mentioned in the description of the present disclosure have been selected by the applicant at his or her discretion, the detailed meanings of which are described in relevant parts of the description herein. Furthermore, it is required that the present disclosure is understood, not simply by the actual terms used but by the meanings of each term lying within.

Throughout the specification, when a certain portion "includes" or "comprises" a certain component, this indicates that other components are not excluded and may be further included unless otherwise noted.

For the sake of brief description with reference to the drawings, the same or equivalent components may be provided with the same reference numbers, and description thereof will not be repeated. For clarity of description, sizes and shapes of the respective components shown in the drawings may be exaggerated or reduced.

The detailed description of the exemplary embodiments of the present disclosure will be given with reference to the accompanying drawings to facilitate those skilled in the art to implement and practice the disclosure. Accordingly, the disclosure should not be limited to the specific embodiments described herein, but should be accorded the broadest scope consistent with the principles and novel features disclosed herein.

Figure 2:
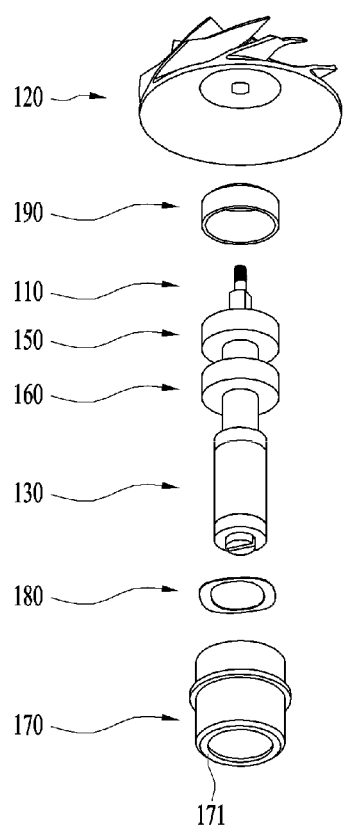
FIG. 2 is an exploded perspective diagram showing portions of the disassembled motor assembly shown in FIG. 1.
Figure 3:
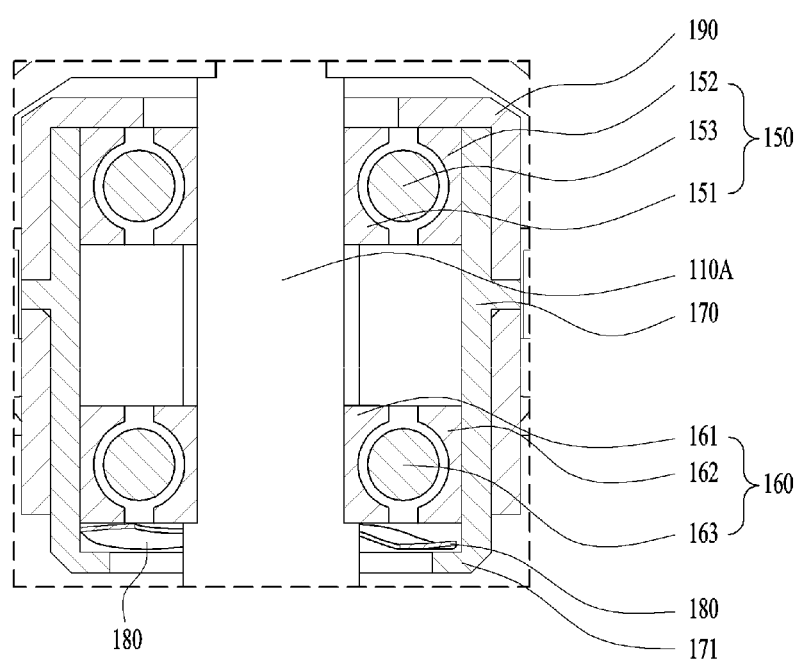
FIG. 3 is an enlarged cross-sectional diagram showing a part 'A' shown in FIG. 1.

FIG. 1 is a cross-sectional diagram showing each configuration of a motor assembly according to one embodiment of the present disclosure, FIG. 2 is an exploded perspective diagram showing portions of the disassembled motor assembly shown in FIG. 1, and FIG. 3 is an enlarged cross-sectional diagram showing a part 'A' shown in FIG. 1.

Referring to FIGS. 1 to 3, a motor assembly 100 may include an inlet body 51, a motor housing 52, a supporter 53, a diffuser 54, a rotating shaft 110, an impeller 120, a rotor 130, a stator 140, a first bearing 150, a second bearing 160, a bearing bracket 170, an elastic member 180, and a separation preventing member 190. Here, the inlet body 51 and the motor housing 52 are the elements forming an exterior of the motor assembly 100 and may have all other elements received in an empty space provided inside.

Particularly, the inner space of the motor assembly 100 may be divided into an impeller space S1 that is an empty space provided within the inlet body 51 and a motor space S2 that is an empty space provided within the motor housing 52. Gas flowing to move through the impeller space S1 and the motor space S2 may cool down the respective elements provided within the motor assembly 100, whereby reducing the heat generation of the motor assembly 100.

The inlet body 51 may have an intake 511 through which gas is sucked, and may be disposed to enclose an outer circumference of the impeller 120. Namely, the impeller space S1, in which the impeller 120 is received rotatably, may be formed within the inlet body 51, an exterior of the inlet body 51 may correspond to a shape of the impeller 120, and an inner surface of the inlet body 51 may be curved to stably guide the gas flowing along the impeller space S1. One side 110A of the rotating shaft may be received in the impeller space S1.

In the following description, one portion of the rotating shaft 110 received in the inlet body 51 will be defined as one side 110A of the rotating shaft 110, and the other portion of the rotating shaft 110 received in the motor housing 52 will be defined as the other side 110B.

Particularly, an opposite side of the intake 511 of the inlet body 51 may be fastened to the motor housing 52 to form the exterior of the motor assembly 100. The fastened portions of the inlet body 51 and the motor housing 52 may be fastened together in a manner of adhering closely to each other so as to prevent the gas flowing inside the motor assembly 100 from leaking externally through a space other than an outlet 521.

Namely, it is preferable that the inlet body 51 and the motor housing 52 are strongly fastened together to prevent a gap from being formed in between. And, the fastening mechanism may employ various ways such as screw coupling, fitting coupling, etc., by which the fastening mechanism is non-limited.

So to speak, the inlet body 51 and the motor housing 52 may include a sort of a case in a hollow shape and the rotating shaft 110 may be disposed in a middle empty space in a manner of extending in an axial direction. As shown in the drawing, the rotating shaft 110 may not be directly supported by the inlet body 51 or the motor housing 52. Namely, in inlet body 51 or the motor housing 52 may not be provided with a separate rotating shaft supporter (named tentatively) for supporting the rotating shaft 110.

The motor housing 52 may be configured to enclose an outer circumference of the stator 140, have the stator 140 installed on an inner circumference of the motor housing 52, and form the exterior of the motor assembly 100. Particularly, the motor space S2 for receiving the other side 110B of the rotating shaft 110, the rotor 130 and the stator 140 therein may be formed within the motor housing 52.

In addition, the motor housing 52 may be provided with the outlet 521 for discharging the gas, which is guided from the impeller space S1 to the motor space S2, from the motor housing 52. With reference to a flowing direction of the gas, the outlet 521 may be formed on the opposite side of the intake 511.

The supporter 53 supports the bearing bracket 170 described later and may be fastened to the motor housing 52. Particularly, a through-hole (not shown) perforated by the rotating shaft 110 is formed at the center of the supporter 53, and the bearing bracket 170 is inserted in the through-hole so as to be installed.

The diffuser 54 may be fastened to the supporter 53 and disposed between the supporter 53 and the impeller 120 to lead the gas flowing into the inlet body 51 toward the motor housing 52. Namely, a prescribed space for enabling gas to flow therein may be formed between the diffuser 54 and the inlet body 51. The diffuser 54 may be fixed to the supporter 53 in a manner of being fastened by a fastening member (not shown) such as nuts and bolts.

Particularly, a plurality of diffuser vanes 541 projected toward an inner surface of the inlet body 51 may be formed on an outer surface of the diffuser 54. A plurality of the diffuser vanes 541 may convert a dynamic pressure of gas passing through the impeller 120 into a static pressure.

A plurality of the diffuser vanes 541 may be disposed in a manner of being substantially spaced apart from each other in the same distance along a circumferential direction on an outer circumference of the diffuser 54, by which embodiments are non-limited. For example, distances among a plurality of the diffuser vanes 541 may gradually increase and then decrease, and vice versa, or may be formed differently. Moreover, the diffuser 54 may further include a through-hole (not shown) perforated by the supporter 53 and the rotating shaft 110.

According to such a structure, the gas flowing into the inlet body 51 through the intake 511 may be led to the space between the inlet body 51 and the diffuser 54 by the impeller 120, while the gas flowing between the inlet body 51 and the diffuser 54 may be led toward the motor space S2 from the impeller space S1 by a plurality of the diffuser vanes 541.

Meanwhile, the diffuser 54 may be integrally formed with the supporter 53. Preferably, the diffuser 54 may be separately manufactured and then fastened to the supporter 53. When the supporter 53 and the diffuser 54 are integrally formed together, an assembly tolerance may be relatively reduced, whereby the flow of the gas flowing into the inlet body 51 may be smoothly performed.

The rotating shaft 110 may be formed to extend in a manner of traversing the impeller space S1 and the motor space S2. Namely, the rotating shaft 110 may be formed to extend in a length direction of the motor assembly 100, i.e., an axial direction.

Particularly, the rotating shaft 110 may be received within the inlet body 51 and the motor housing 52. Namely, one portion of the rotating shaft 110 may be received in the inlet body 51 along the length direction and the other portion may be received in the motor housing 52. And, the portion of the rotating shaft 110 received in the inlet body 51 may be received in the bearing bracket 170 described later.

So to speak, one side 110A of the rotating shaft 110 may be disposed on the side including the inlet body 51 and the bearing bracket 170, and the other side 110B of the rotating shaft 110 may be disposed on the side of the motor housing 52.

One end 110C of the rotating shaft 110 may be a free end not supported by the inlet body 51 or the bearing bracket 170, and the other end 110D of the rotating shaft 110 may be a free end not supported by the motor housing 52 as well.

Here, 'free end' may mean an end portion of each of both sides of the rotating shaft 110, which is not supported or intervened by any element.

One end 110C of the rotating shaft 110 may be disposed to be adjacent to the impeller 120 rather than the rotor 130 and may be a free end on the side of the impeller 120. The other end 110D of the rotating shaft 110 may be disposed to be adjacent to the rotor 130 rather than the impeller 120 and may be a free end on the side of the rotor 130.

In some implementations, a part of the rotating shaft 110 between the one end 110C and the other end 110D may be supported by a plurality of bearings. Here, a plurality of the bearings may mean the first and second bearings 150 and 160 described later, which will be specifically described in the following.

Meanwhile, the rotating shaft 110 may include an impeller coupling part 111 having the impeller 120 installed thereon, a first support part 112 having the first bearing 150 installed thereon, a second support part 113 having the second bearing 160 installed thereon, and a rotor coupling part 114 having the rotor 130 installed thereon.

As a portion of the rotating shaft 110 having the impeller 120 installed thereon, the impeller coupling part 111 is a part of the one side 110A of the rotating shaft 110 adjacent to the one end 110C and may be disposed in the impeller space S1 in a manner of being adjacent to the intake 511 of the inlet body 51 through which gas flows in from outside.

As a portion of the rotating shaft 110 having the first bearing 150 (described later) installed thereon, the first support part 112 is a part corresponding to the one side 110A of the rotating shaft 110 and may be disposed in the impeller space S1. Namely, as a portion of the rotating shaft 110 overlapping with the first bearing 150 along a radial direction of the rotating shaft 110, the first support part 112 may be supported by the first bearing 150 in a radial direction and an axial direction.

As a portion of the rotating shaft 110 having the second bearing 160 (described later) installed thereon, the second support part 113 is a part corresponding to the one side 110A of the rotating shaft 110 and may be disposed in the impeller space S1. Namely, as a portion of the rotating shaft 110 overlapping with the second bearing 160 along a radial direction of the rotating shaft 110, the first support part 112 may be supported by the second bearing 160 in a radial direction and an axial direction.

Each of the first support part 112 and the second support part 113 is the part corresponding to the one side 110A of the rotating shaft 110, the first support part 112 may be further adjacent to the side of the impeller 120 than the second support part 113 and the second support part 113 may be further adjacent to the side of the rotor 130 than the first support part 112.

As a portion of the rotating shaft 110 having the rotor 130 installed thereon, the rotor coupling part 114 is a part adjacent to the other end 110D in the other side 110B of the rotating shaft 110 and may be disposed in the motor space S2. Namely, the rotor coupling part 114 may be a part of the rotating shaft 110 overlapping with the rotor 130 along the radial direction of the rotating shaft 110.

The rotating shaft 110 may be rotated by the electromagnetic interaction between the rotor 130 and the stator 140. As the rotating shaft 110 is rotated, the impeller 120 fastened to the rotating shaft 110 may be rotated together with the rotating shaft 110. By the rotation of the impeller 120, gas may be sucked into the motor assembly 100.

The impeller 120 may be installed on the one side 110A of the rotating shaft 110. Namely, the impeller 120 may be installed on the side opposite to the other side 110B of the rotating shaft 110 having the rotor 130 installed thereon with reference to the axial direction of the rotating shaft 110. As described above, the impeller 120 may be rotated together according to the rotation of the rotating shaft 110 by being fastened to the impeller coupling part 111 of the rotating shaft 110, and disposed in the impeller space S1 provided in the inlet body 51.

Particularly, the impeller 120 may include a hub 121 and a plurality of blades 122 extended outward from an outer circumference of the hub 121. Meanwhile, the impeller 120 may be molded out of high-strength synthetic resin material such as polyetheretherketone (PEEK) and the like, by which the material of the impeller 120 is non-limited. Alternatively, the impeller 120 may be formed of metal as well as high-density synthetic resin.

Moreover, the impeller 120 may include a diagonal flow type impeller that sucks gas such as air and the like in the axial direction of the rotating shaft 110 and then discharges the gas in an inclined direction between a centrifugal direction and the axial direction. Namely, the gas flowing into the inlet body 51 through the intake 511 may be led toward the motor housing 52 along the outer surface of the hub 121 depending on the rotation of the blades 122.

Yet, the embodiments of the present disclosure are non-limited by the above description. Alternatively, the impeller 120 may be configured as a centrifugal impeller that sucks gas in the axial direction and then discharges it in the centrifugal direction. Yet, for clarity of the following description, the impeller 120 will be described with reference to the case of the impeller of the diagonal flow type.

The rotor 130 may be installed on the other side 110B of the rotating shaft 110. So to speak, the rotor 130 may be installed on the rotor coupling part 114 located on the other side 110B of the rotating shaft 110. Namely, the rotor 130 may be coupled to the rotating shaft 110 so as to enclose the outer circumference of the rotating shaft 110 and may be disposed in the motor space S2 having the rotor coupling part 114 located therein.

Particularly, the rotor 130 may include a magnet 131 and a magnet core (not shown) having the magnet mounted 131 thereon. And, the rotor 130 may further include first and second end plates 132 and 133 disposed by being spaced apart from each other in a prescribed distance centering on the magnet 131 along the axial direction of the rotating shaft 110.

The first and second end plates 132 and 133 may be installed on the rotating shaft 110 to enclose the rotating shaft 110, and may support both ends of the magnet 131 and the magnet core with reference to the axial direction of the rotating shaft 110, thereby firmly fixing the magnet 131 and the magnet core to the rotating shaft 110 so as to prevent them from being moved along the axial direction.

The stator 140 is installed on the inner circumference of the motor housing 52 and may enclose an outside of the rotor 130 by being spaced apart from the rotor 130 in a prescribed distance along the radial direction of the rotating shaft 110. Namely, like the rotor 130, the stator 140 may be disposed in the motor space S2 in which the rotor coupling part 114 of the rotating shaft 110 is installed.

Particularly, the stator 140 may include a stator core 141 configured with conductor, a coil 142 wound on the stator core 141, and an insulator 143 electrically insulating the stator core 11 and the coil 142 from each other. A current may be applied to the coil 142. As the current is applied to the coil 142, the rotor 130 may rotate against the stator 140.

The first bearing 150 is installed on the one side 110A of the rotating shaft 110 to support the rotation of the rotating shaft 110, and may support the first support part 112 of the rotating shaft 110 by being installed between the impeller 120 and the rotor 130 so as to be adjacent to the impeller 120. Moreover, the first bearing 150 may be received in an empty space provided in the bearing bracket 170.

Particularly, the first bearing 150 may include a first inner ring 151 fixed to an outer circumference of the first support part 112 of the rotating shaft 110 by press fitting, a first outer ring 152 contacting with an inner surface of the bearing bracket 170, and a first roll member 153 inserted between the first inner ring 151 and the first outer ring 152 to support a relative rotational motion of the first inner ring 151 to the first outer ring 152.

Like the first bearing, the second bearing 160 is installed on the one side 110A of the rotating shaft 110 to support the rotation of the rotating shaft 110, and may support the second support part 113 of the rotating shaft 110 by being installed between the impeller 120 and the rotor 130 so as to be adjacent to the rotor 130. Moreover, the second bearing 160 may be received in the empty space provided in the bearing bracket 170 together with the first bearing 150.

Particularly, the second bearing 160 may include a second inner ring 161 fixed to an outer circumference of the second support part 113 of the rotating shaft 110 by press fitting, a second outer ring 162 contacting with the inner surface of the bearing bracket 170, and a second roll member 163 inserted between the second inner ring 161 and the second outer ring 162 to support a relative rotational motion of the second inner ring 161 to the second outer ring 162.

Particularly, one of the first and second outer rings 152 and 162 may be fixed to the inner surface of the bearing bracket 170 by press fitting, while the other may be fixed to the inner surface of the bearing bracket 170 through an adhesive agent.

Namely, the first outer ring 152 and the second outer ring 162 may differ from each other in a way of being fixed to the inner surface of the bearing bracket 170. Which one of the first and second outer rings 152 and 162 will be fixed to the inner surface of the bearing bracket 170 through press fitting or an adhesive agent may be determined depending on pressurizing either the first outer ring 152 or the second outer ring 162 by the elastic member 180 described later.

Namely, one of the first and second outer rings 152 and 162, which is pressurized by the elastic member 180, may be fixed to the inner surface of the bearing bracket 170 through the adhesive agent, while the other one not pressurized by the elastic member 180 may be fixed to the inner surface of the bearing bracket 170 by press fitting.

For example, as shown in FIGS. 1 to 3, while the elastic member 180 is pressurizing the second outer ring 162, the first outer ring 152 may be fixed to the inner surface of the bearing bracket 170 by press fitting and the second outer ring 162 may be fixed to the inner surface of the bearing bracket 170 through the adhesive agent.

Moreover, the other one of the first outer ring 152 and the second outer ring 162, i.e., the first or second outer ring 152 or 162 fixed to the inner surface of the bearing bracket 170 through the adhesive agent may be slidable in a prescribed distance toward the axial direction of the rotating shaft 110 along the inner surface of the bearing bracket 170 during a prescribed time right after the other one of the first outer ring 152 and the second outer ring 162 has been attached to the inner surface of the bearing bracket through the adhesive agent.

After expiration of the prescribed time, the other one of the first outer ring 152 and the second outer ring 162 may be fixed to the inner surface of the bearing bracket as the adhesive agent is fixed.

For example, referring to FIGS. 1 to 3, in case of the second outer ring 162 fixed to the inner surface of the bearing bracket 170 through the adhesive agent, it can move in a prescribed distance toward the axial direction of the rotating shaft 110 along the inner surface of the bearing bracket 170 for a prescribed time right after being attached to the inner surface of the bearing bracket 170 through the adhesive agent. After expiration of the prescribed time, the second outer ring 162 may be fixed to the inner surface of the bearing bracket 170 as the adhesive is fixed.

Thus, the second outer ring 162 is capable of sliding along the inner surface of the bearing bracket 170 before the adhesive agent is fixed, which is because the elastic member 180 pressurizes the second outer ring 162 toward the first outer ring 152. In addition, through the pressurizing force of the elastic member 180, the first bearing 150 and the second bearing 160 may be pre-loaded. Through this, alignment of the first and second bearings 150 and 160 may be improved. The force relationship among the first outer ring 152, the second outer ring 162 and the elastic member 180 will be described in detail with reference to FIGS. 9 to 10B.

In some implementations, each of the two bearings 150 and 160 eccentrically supporting the rotating shaft 110 has an outer diameter D greater than an inner diameter d of the stator 140, sufficient bearing life can be secured by enlarging a bearing size more.

Regarding this, according to embodiments of the present disclosure, as the inter-bearing alignment can be improved as well as the rotating shaft 110 can be stably supported without supporting the other side 110B of the rotating shaft 110, the above description can be considered for design. Hence, enlarging the outer diameters D of the first and second bearings 150 and 160 means that the life of the bearing structure can be secured sufficiently.

The bearing bracket 170 is installed on the supporter 53, and the first and second bearings 150 and 160 may be received in an empty space inside the bearing bracket 170. And, the bearing bracket 170 may have a short sill overlapping with the second outer ring 162 of the second bearing 160 with reference to the axial direction of the rotating shaft 110.

The short sill 171 may support the second outer ring 162 while the elastic member 180 is inserted in between and may prevent the second outer ring 162 and the elastic member 180 from being moved toward the rotor 130 so as to prevent them from being separated toward the rotor 130.

A side of the bearing bracket 170 opposite to the short sill 171, i.e., a side facing the impeller 120 may be open without such a member as the short sill 171. This is to secure a space for the first and second bearings 150 and 160 to be inserted in the bearing bracket 170. Thus, after the first and second bearings 150 and 160 have been inserted in the inner space of the bearing bracket 170, the separation preventing member 190 are installed on the bearing bracket 170 to prevent the first and second bearings 150 and 160 from being moved toward the impeller 120 in order to prevent the first and second bearings 150 and 160 from being separated toward the impeller 120.

Accordingly, when the two bearings 150 and 160 are received in the single bearing bracket 170, the two bearings 150 and 160 are disposed in a manner of being spaced apart from each other in a prescribed distance along the axial direction of the rotating shaft 110. Thus, since the single bearing bracket 170 is used to receive the two bearings 150 and 160, the overall structure of the motor assembly 100 may be simplified. Simultaneously, as the rotating shaft 110 is supported by the two bearings 150 and 160, the reliability and durability of the bearing structure can be secured.

The elastic member 180 is inserted between the first bearing 150 and the bearing bracket 170 or between the second bearing 160 and the bearing bracket 170, it may pressurize one of the first bearing 150 and the second bearing 160 in a direction for the first and second bearings 150 and 160 to get closer to each other.

Referring to FIGS. 1 to 3, the elastic member 180 may be inserted between the second bearing 160 and the bearing bracket 170, thereby pressurizing the second bearing 160 toward the first bearing 150.

Particularly, the elastic member 180 may pressurize the second outer ring 162 of the second bearing 160 toward the first outer ring 152 of the first bearing 150. The relationship of the force generated among the first bearing 150, the second bearing 160 and the elastic member 180 will be described in detail with reference to FIGS. 9 to 10B.

The separation preventing member 190 is installed on the separation preventing member 190 in a manner that at least one portion of the separation preventing member 190 overlaps with one of the first bearing 150, the second bearing 160 and the elastic member 180 with reference to the axial direction of the rotating shaft 110, thereby fixing the first bearing 150, the second bearing 160 and the elastic member 180 to the inner space of the bearing bracket 170.

Particularly, at least one portion of the separation preventing member 190 contacts with the first outer ring 152 of the first bearing 150, the second outer ring 162 of the second bearing 160 or the elastic member 180, thereby preventing the first outer ring 152, the second outer ring 162 or the elastic member 180 from being moved toward the impeller 120 or the rotor 130 so as to prevent the first outer ring 152, the second outer ring 162 or the elastic member 180 from being separated from the bearing bracket 170.

Referring to FIGS. 1 to 3, the separation preventing member 190 may include a sort of a cover installed on the bearing bracket 170 to enclose the outer circumference of the bearing bracket 170. The separation preventing member 190 may overlap with the first outer ring 152 of the first bearing 150 with reference to the axial direction and contact with the first outer ring 152 to prevent the first outer ring 152 from being moved toward the impeller 120.

Figure 4:
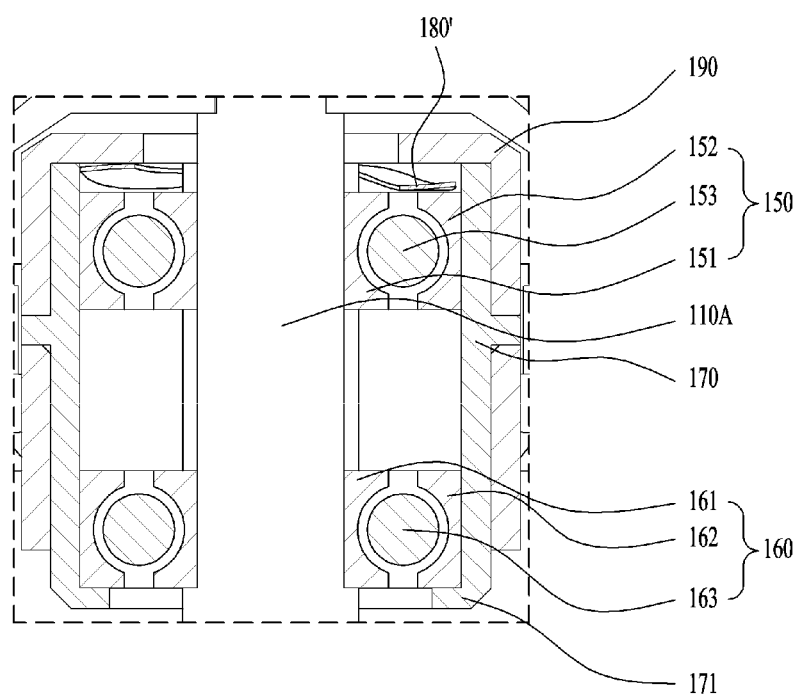
FIG. 4 is an enlarged cross-sectional diagram showing a modified example of FIG. 3.

FIG. 4 is an enlarged cross-sectional diagram showing a modified example of FIG. 3.

Referring to FIG. 4, an elastic member 180' may be inserted between the separation preventing member 190 and the first outer ring 152. Namely, the elastic member 180' is inserted between the separation preventing member 190 and the first outer ring 152, thereby pressurizing the first bearing 150 toward the second bearing 160.

Particularly, the elastic member 180' may pressurize the first outer ring 152 of the first bearing 150 toward the second outer ring 162 of the second bearing 160. The relationship of the force generated among the first bearing 150, the second bearing 160 and the elastic member 180' will be described in detail with reference to FIGS. 9 to 10B.

In some implementations, as shown in FIG. 4, while the elastic member 180' is pressurizing the first outer ring 152, the second outer ring 162 may be fixed to the inner surface of the bearing bracket 170 by press fitting and the first outer ring 152 may be fixed to the inner surface of the bearing bracket 170 through an adhesive agent.

Moreover, in case of the first outer ring 152 fixed to the inner surface of the bearing bracket 170 through the adhesive agent, it may be movable in a prescribed distance toward the axial direction of the rotating shaft 110 along the inner surface of the bearing bracket 170 during a prescribed time right after the first outer ring 152 has been attached to the inner surface of the bearing bracket 170 through the adhesive agent. After expiration of the prescribed time, the first outer ring 152 may be fixed to the inner surface of the bearing bracket 170 as the adhesive is fixed.

Thus, the first outer ring 152 is capable of sliding along the inner surface of the bearing bracket 170 before the adhesive agent is fixed, which is because the elastic member 180' pressurizes the first outer ring 152 toward the second outer ring 162. In addition, through the pressurizing force of the elastic member 180', the first bearing 150 and the second bearing 160 may be pre-loaded. Through this, alignment of the first and second bearings 150 and 160 may be improved. The force relationship among the first outer ring 152, the second outer ring 162 and the elastic member 180' will be described in detail with reference to FIGS. 9 to 10B.

Figure 5:
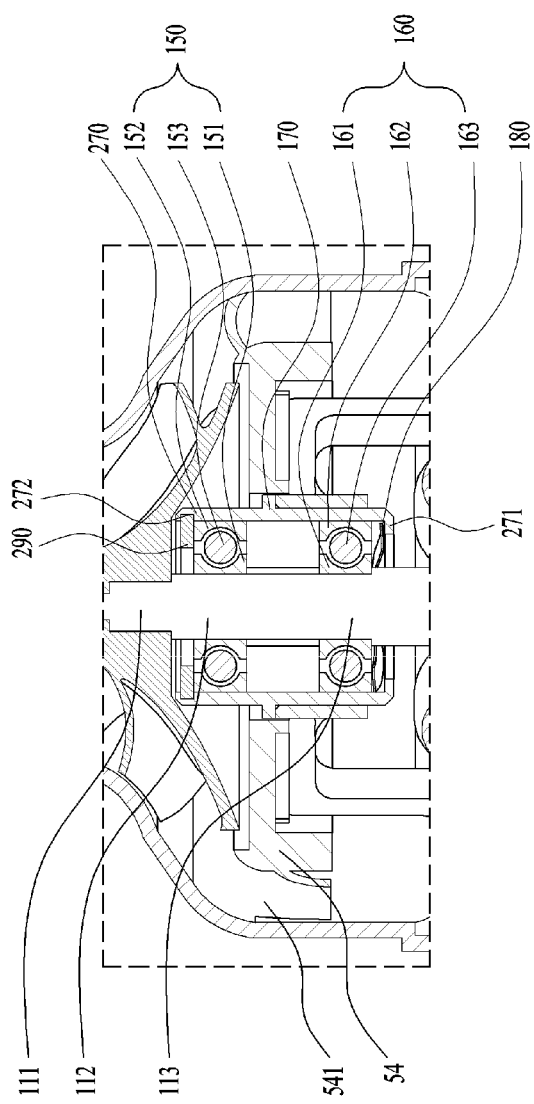
FIG. 5 is an enlarged cross-sectional diagram showing another modified example of FIG. 3.
Figure 6A:
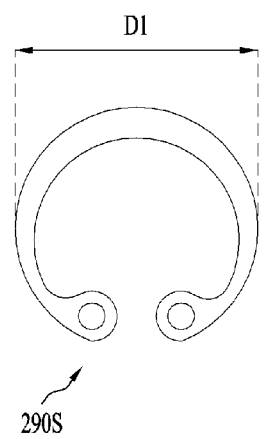
FIGS. 6A and 6B are conceptual diagrams showing the comparison between a normal state and a compressed state of a separation preventing member shown in FIG. 5.
Figure 6B:
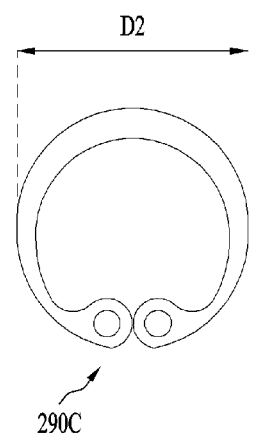
Figure 7:
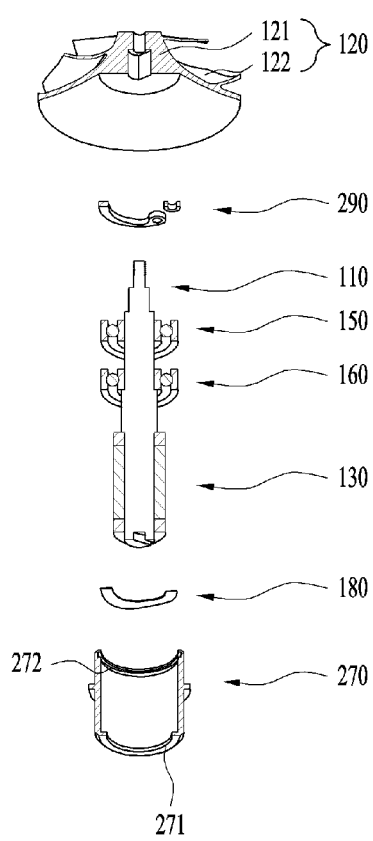
FIG. 7 is an exploded cutting perspective diagram showing portions of a motor assembly shown in FIG. 5, which is disassembled and cut.

FIG. 5 is an enlarged cross-sectional diagram showing another modified example of FIG. 3, FIGS. 6A and 6B are conceptual diagrams showing the comparison between a normal state and a compressed state of a separation preventing member shown in FIG. 5, and FIG. 7 is an exploded cutting perspective diagram showing portions of a motor assembly shown in FIG. 5, which is disassembled and cut.

Referring to FIGS. 5 to 7, a bearing bracket 270 may include an installation groove 272 recessed in a prescribed interval along a radiation direction of the rotating shaft 110 from an inner circumference of the bearing bracket 270, and a separation preventing member 290 may be installed in the installation recess 272.

The separation preventing member 290 shown in FIG. 5 and FIG. 7 may overlap with the first outer ring 152 of the first bearing 150 with reference to the axial direction and contact with the first outer ring 152 to prevent movement of the first outer ring 152 toward the impeller 120.

The separation preventing member 290 may include a sort of a snap ring installable in the installation groove 272 in a compressed state. Particularly, referring to FIGS. 6A and 6B, the separation preventing member 290 may be elastically deformable between a compressed state 290C of being compressed by an externally applied force and a normal state 290S expanding from the compressed state 290C according to a removal of the externally applied force (D1>D2).

Namely, referring to FIG. 5 to FIG. 6B together, the separation preventing member 290 may have a diameter substantially corresponding to or smaller than a diameter of an inner circumference of the bearing bracket 270 in the compressed state 290C (D2≤270d). According to this structure, the separation preventing member 290 enters an inner space of the bearing bracket 270 in the compressed state 290C, thereby being fixed to the installation recess 272 in a state returning to the normal state 290S.

In a state that the elastic member 180 is pressurizing the second outer ring 162, as shown in FIG. 5, the first outer ring 152 may be fixed to the inner surface of the bearing bracket 270 by press fitting and the second outer ring 162 may be fixed to the inner surface of the bearing bracket 270 through an adhesive agent.

In case of the second outer ring 162 fixed to the inner surface of the bearing bracket 270 through the adhesive agent, it can move in a prescribed distance toward the axial direction of the rotating shaft 110 along the inner surface of the bearing bracket 270 for a prescribed time right after being attached to the inner surface of the bearing bracket 270 through the adhesive agent. After expiration of the prescribed time, the second outer ring 162 may be fixed to the inner surface of the bearing bracket 270 as the adhesive is fixed.

Thus, the second outer ring 162 is capable of sliding along the inner surface of the bearing bracket 270 before the adhesive agent is fixed, which is because the elastic member 180 pressurizes the second outer ring 162 toward the first outer ring 152. In addition, through the pressurizing force of the elastic member 180, the first bearing 150 and the second bearing 160 may be pre-loaded. Through this, alignment of the first and second bearings 150 and 160 may be improved. The force relationship among the first outer ring 152, the second outer ring 162 and the elastic member 180 will be described in detail with reference to FIGS. 9 to 10B.

Figure 8:
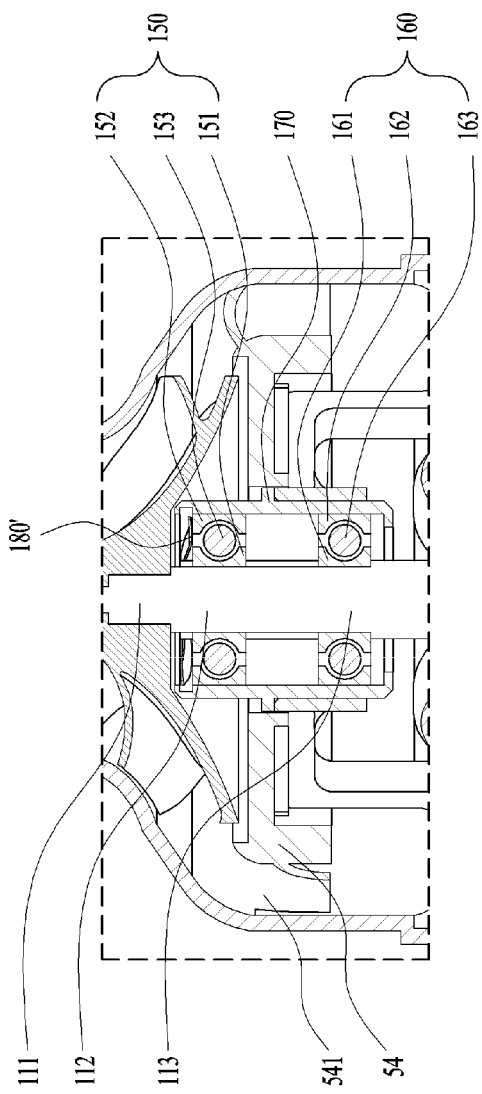
FIG. 8 is an enlarged cross-sectional diagram showing a modified example of FIG. 7.

FIG. 8 is an enlarged cross-sectional diagram showing a modified example of FIG. 7.

Referring to FIG. 8, an elastic member 180' may be inserted between the separation preventing member 290 and the first outer ring 152. Namely, the elastic member 180' is inserted between the separation preventing member 290 and the first outer ring 152, thereby pressurizing the first bearing 150 toward the second bearing 160.

Particularly, the elastic member 180' may pressurize the first outer ring 152 of the first bearing 150 toward the second outer ring 162 of the second bearing 160. The relationship of the force generated among the first bearing 150, the second bearing 160 and the elastic member 180' will be described in detail with reference to FIGS. 9 to 10B.

In some implementations, as shown in FIG. 8, while the elastic member 180' is pressurizing the first outer ring 152, the second outer ring 162 may be fixed to the inner surface of the bearing bracket 270 by press fitting and the first outer ring 152 may be fixed to the inner surface of the bearing bracket 270 through an adhesive agent.

Moreover, in case of the first outer ring 152 fixed to the inner surface of the bearing bracket 270 through the adhesive agent, it may be movable in a prescribed distance toward the axial direction of the rotating shaft 110 along the inner surface of the bearing bracket 270 during a prescribed time right after the first outer ring 152 has been attached to the inner surface of the bearing bracket 270 through the adhesive agent. After expiration of the prescribed time, the first outer ring 152 may be fixed to the inner surface of the bearing bracket 270 as the adhesive is fixed.

Thus, the first outer ring 152 is capable of sliding along the inner surface of the bearing bracket 270 before the adhesive agent is fixed, which is because the elastic member 180' pressurizes the first outer ring 152 toward the second outer ring 162. In addition, through the pressurizing force of the elastic member 180', the first bearing 150 and the second bearing 160 may be pre-loaded. Through this, alignment of the first and second bearings 150 and 160 may be improved. The force relationship among the first outer ring 152, the second outer ring 162 and the elastic member 180' will be described in detail with reference to FIGS. 9 to 10B.

Figure 9:
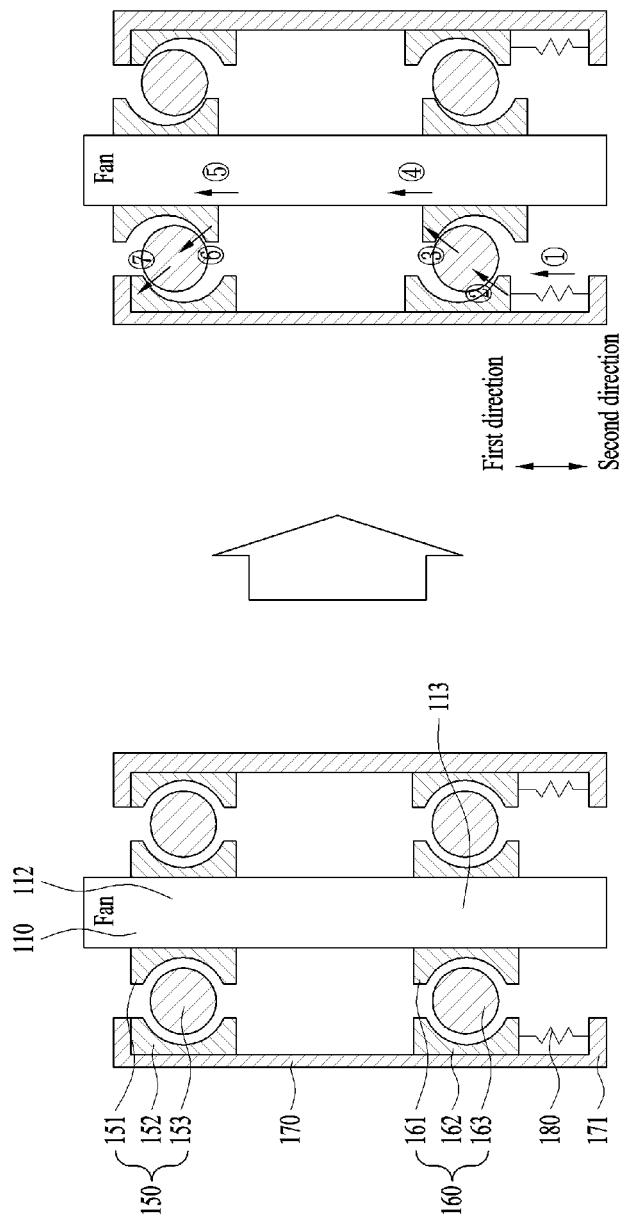
FIG. 9 is a conceptual diagram specifically showing the relationship of the force applied to a rotating shaft, a first bearing and a second bearing by an elastic member shown in FIG. 3 and FIG. 5.

FIG. 9 is a conceptual diagram specifically showing the relationship of the force applied to a rotating shaft, a first bearing and a second bearing by an elastic member shown in FIG. 3 and FIG. 5 and FIGS. 10A and 10B is a conceptual diagram specifically showing the relationship of the force applied to a rotating shaft, a first bearing and a second bearing by an elastic member shown in FIG. 4 and FIG. 8.

Figure 10B:
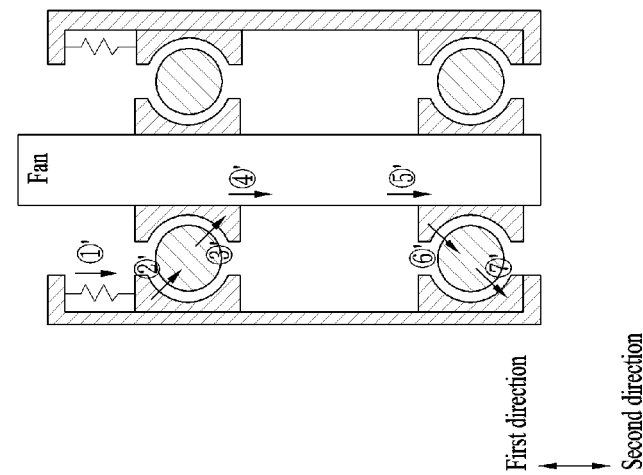
FIGS. 10A and 10B are conceptual diagrams specifically showing the relationship of the force applied to a rotating shaft, a first bearing and a second bearing by an elastic member shown in FIG. 4 and FIG. 8.

Reference numbers 110, 150, 160, 170, 180 and 190 shown in FIGS. 9 to 10B refer to a rotating shaft 110, a first bearing 150, a second bearing 160, a bearing bracket 170, an elastic member 180 and a separation preventing member 190 through conceptualization and illustration and have the same unique properties and inter-coupling relationship of the former components depicted in FIGS. 1 to 8 despite differing somewhat in specific shapes or sizes of the respective configurations.

Namely, the depiction of the components shown in FIGS. 9 to 10B is provided to describe the relationship of the force among the rotating shaft 110, the first bearing 150, the second bearing 160 and the elastic member 180. And, the structures or coupling relations of embodiments are non-limited by the shapes or sizes of the components shown in FIGS. 9 to 10B.

FIG. 9 depicts a case that an elastic member 180 pressurizes a second outer ring 162 of a second bearing 160 toward a first outer ring 152 of a first bearing 150 (i.e., in a first direction). Referring to FIG. 9, the elastic member 180 pressurizes the second outer ring 162 toward the first outer ring 152 (①), a second roll member 163 receives a pressurizing force of the elastic member 180 from the second outer ring 162 (②) and then delivers it to a second inner ring 161 (③), a rotating shaft 110 is moved in a direction of the pressurizing force delivered to the second inner ring 161, i.e., the first direction (④), a first inner ring 151 is moved in the first direction together with the rotating shaft 110 (⑤), the first inner ring 151 delivers the pressurizing force to a first roll member 153 (⑥), and the first roll member 153 may deliver the pressurizing force received from the first inner ring 151 to the first outer ring 152 (⑦).

Thus, as the elastic member 180 pressurizes the second outer ring 162 toward the first outer ring 152, the first roll member 153 may maintain a state of substantially contacting with the first inner ring 151 and the first outer ring 152 and the second roll member 163 may maintain a state of substantially contacting with the second inner ring 161 and the second outer ring 162 as well [see the right diagram of FIG. 9].

Figure 10A:
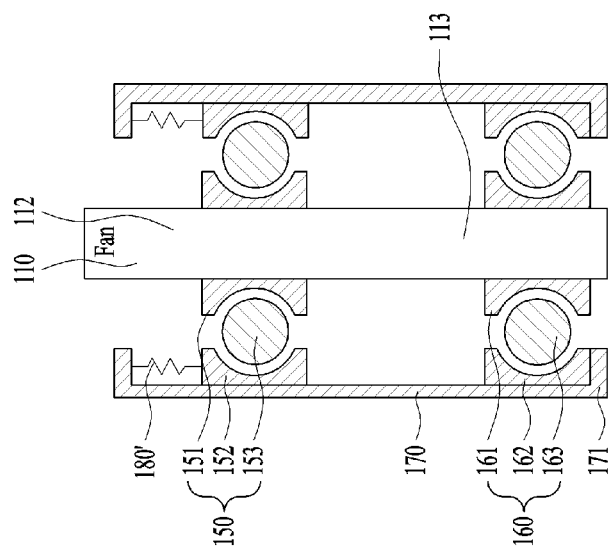

FIGS. 10A and 10B depict a case that an elastic member 180' pressurizes a second outer ring 162 of a second bearing 160 toward a first outer ring 152 of a first bearing 150 (i.e., in a second direction). Referring to FIG. 10A, the elastic member 180' pressurizes the first outer ring 152 toward the second outer ring 162 (①'), a first roll member 153 receives a pressurizing force of the elastic member 180' from a first outer ring 152 (②') and then delivers it to a first inner ring 151 (③'), a rotating shaft 110 is moved in a direction of the pressurizing force delivered to the first inner ring 151, i.e., the second direction (④'), a second inner ring 161 is moved in the second direction together with the rotating shaft 110 (⑤'), the second inner ring 161 delivers the pressurizing force to a second roll member 163 (⑥'), and the second roll member 163 may deliver the pressurizing force received from the second inner ring 161 to the second outer ring 152 (⑦').

Thus, as the elastic member 180' pressurizes the first outer ring 152 toward the second outer ring 162, the first roll member 153 may maintain a state of substantially contacting with the first inner ring 151 and the first outer ring 152 and the second roll member 163 may maintain a state of substantially contacting with the second inner ring 161 and the second outer ring 162 as well [see FIG. 10B].

Thus, the downsizing and weight-lightening of the motor assembly 100 may be implemented by applying appropriate pre-load to the bearings 150 and 160 using the elastic member 180/180' while eccentrically supporting the rotating shaft with the two bearings 150 and 160 (i.e., a separate bearing structure is unnecessary because the other side 110B of the rotating shaft 110 does not supporting the bearings). Simultaneously, noise and vibration may be reduced by improving alignment between the two bearings 150 and 160

Figure 11:
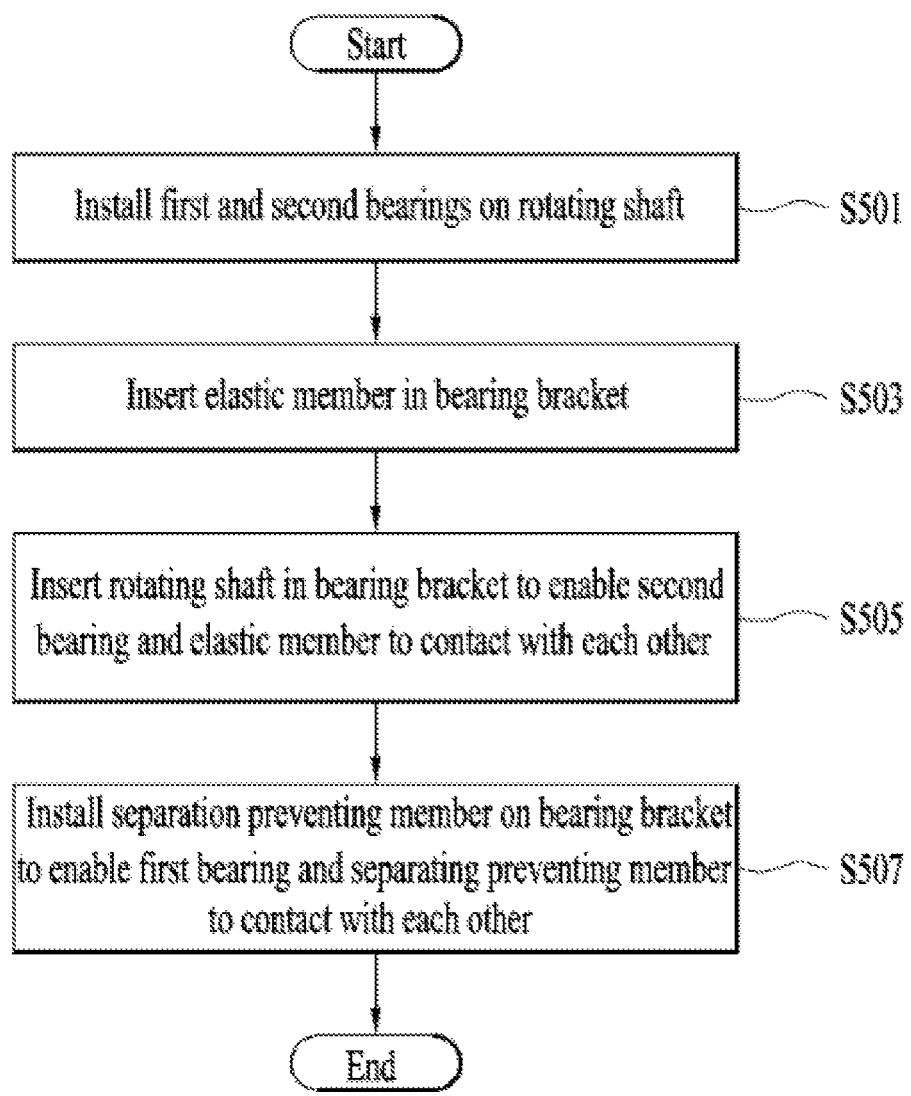
FIG. 11 is a flowchart schematically showing a method of manufacturing a motor assembly shown in FIG. 3 and FIG. 5.

FIG. 11 is a flowchart schematically showing a method of manufacturing a motor assembly shown in FIG. 3 and FIG. 5, and FIGS. 12 to 16 are conceptual diagrams showing a method of manufacturing a motor assembly shown in FIG. 11 in order.

Referring to FIG. 11, a method of manufacturing the motor assembly 100 shown in FIG. 3 and FIG. 5 may include a step S501 of installing the first and second bearings 150 and 160 on the rotating shaft 110, a step S503 of inserting the elastic member 180 in the bearing bracket 170/270, a step S505 of inserting the rotating shaft 110 in the bearing bracket 170/270 to enable the second bearing 160 and the elastic member 180 to contact with each other, and a step S507 of installing the separation preventing member 190/290 on the bearing bracket 170/270 to enable the first bearing 150 and the separating preventing member 190/290 to contact with each other.

After the separation preventing member 190/290 has been installed on the bearing bracket 170/270, the elastic member 180 is inserted between the second bearing 160 and the bearing bracket 170/270 so as to pressurize the second bearing 160 in a direction for the first and second bearings 150 and 160 to get closer to each other.

Figure 12:
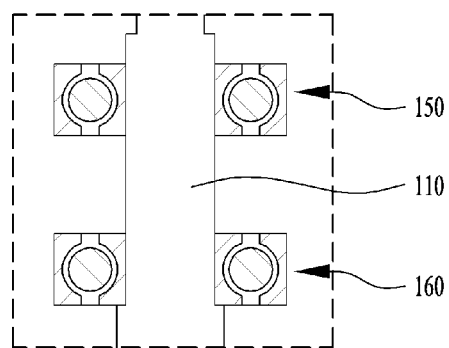
FIGS. 12 to 16 are conceptual diagrams showing a method of manufacturing a motor assembly shown in FIG. 11 in order.

Referring to FIG. 11 and FIG. 12 together, the first inner ring 151 of the first bearing 150 may be fixed to the first support part 112 of the rotating shaft 110 by press fitting, and the second inner ring 161 of the second bearing 160 may be fixed to the second support part 113 of the rotating shaft 110 by press fitting [S501].

As described above, the first support part 112 and the second support part 113 may be located on the one side 110A of the rotating shaft 110 in a manner of being spaced apart from each other in a prescribed distance along the axial direction of the rotating shaft 110. Hence, the first and second bearings 150 and 160 may be installed on the one side 110A as well and disposed in a manner of being spaced apart from each other in a prescribed distance along the axial direction of the rotating shaft 110.

Figure 13:
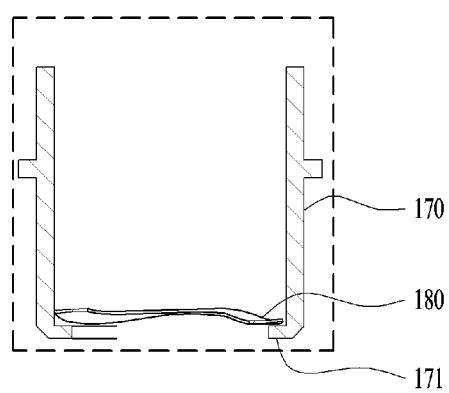

Referring to FIG. 11 and FIG. 13 together, before the rotating shaft 110, the first bearing 150 and the second bearing 160 are inserted and installed in the bearing bracket 170, the elastic member 180 may be inserted in the bearing bracket 170 [S503]. In doing so, the elastic member 180 may be inserted in the inner space of the bearing bracket so as to be caught on the short sill 171 of the bearing bracket 170.

Figure 14:
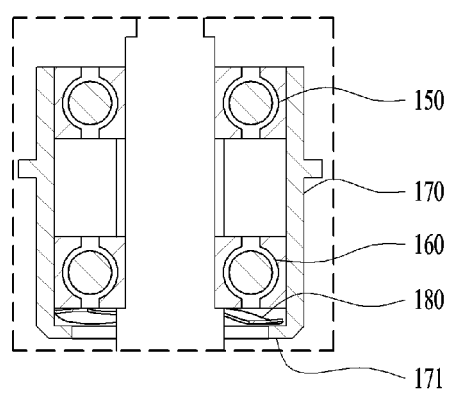

Referring to FIG. 11 and FIG. 14 together, in the state that the elastic member 180 is inserted and installed in the inner space of the bearing bracket 170, the rotating shaft 110 having the first and second bearings 150 and 160 installed thereon may be inserted to perforate the bearing bracket 170, whereby the second bearing 160 may contact with the elastic member 180 [S505].

In doing so, the first outer ring 152 of the first bearing 150 may be fixed to the inner surface of the bearing bracket 170 by press fitting and the second outer ring 162 may be fixed to the inner surface of the bearing bracket 170 through the adhesive agent.

Figure 15:
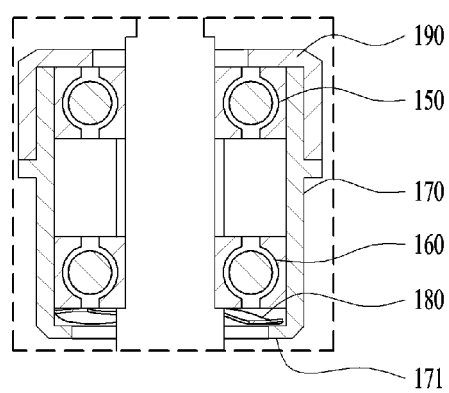

Referring to FIG. 11 and FIG. 15 together, in the state that the first and second bearings 150 and 160 are installed on the inner surface of the bearing bracket 170, the separation preventing member 190 may be installed on the bearing bracket 170 so as to enclose the outer circumference of the bearing bracket 170 [S507].

Particularly, the separation preventing member 190 may contact with the first bearing 150 and at least one portion thereof may overlap with the outer ring 152 of the first bearing 150 along the axial direction of the rotating shaft 110. Hence, the first bearing 150 is fixed by the separation preventing member 190 and seated within the bearing bracket 170 without being separated in the direction toward the impeller 120.

Figure 16:
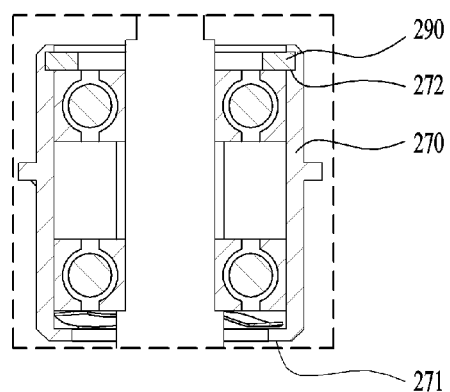

Meanwhile, referring to FIG. 11 and FIG. 16, although the step S501 of installing the first and second bearings 150 and 160 on the rotting shaft 110, the step S503 of inserting the elastic member 180 in the bearing bracket 270, and the step S505 of installing the rotating shaft 110 having the first and second bearings 150 and 160 installed thereon in the bearing bracket 270 so as to perforate the bearing bracket 270 are the same, the bearing bracket 270 may further include an installation groove 272 recessed from the inner circumference of the bearing bracket 270 in a prescribed interval along a radial direction of the rotating shaft 110 unlike the former bearing bracket 170 shown in FIGS. 12 to 15.

Namely, while the rotating shaft 110 having the first and second bearings 150 and 160 installed thereon is inserted in the bearing bracket 270 having the installation groove 272 and the second outer ring 162 receives a pressurizing force from the elastic member 180 in a direction facing the first bearing 150, the separation preventing member 290 may be installed in the installation groove 272 in the compressed state (see 290C of FIG. 6B), thereby supporting the first bearing 150.

As described above, the separation preventing member 290 shown in FIG. 16 can be elastically deformed between the compressed state (290C of FIG. 6B) of being compressed by an externally applied force and the normal state (290S of FIG. 6A) of expanding from the compressed state 290C depending on an externally applied force.

Namely, the separation preventing member 290 in the compressed state 290C enters the bearing bracket 270, is seated on the installation groove 272, and then expands into the normal state 290S, thereby being firmly fixed to the installation groove 272. The separation preventing member 290 installed in the installation groove 272 overlaps with the first outer ring 152 of the first bearing 150 along the axial direction of the rotating shaft 110, thereby fixing the first outer ring 152 to the inside of the bearing bracket 170 in order to prevent the first outer ring 152 from be separated out of the bearing bracket 270.

Figure 17:
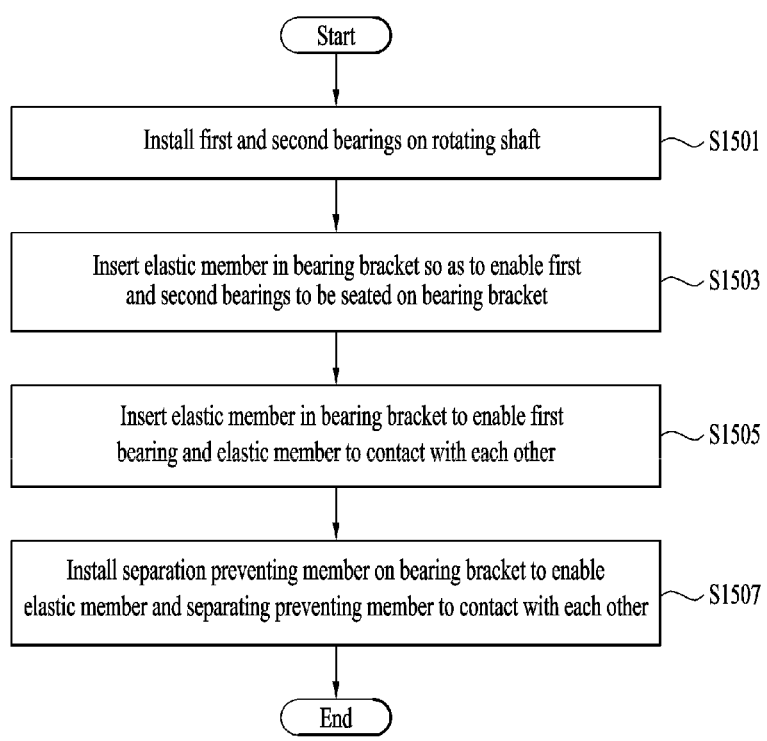
FIG. 17 is a flowchart schematically showing a method of manufacturing a motor assembly shown in FIG. 4 and FIG. 8.

FIG. 17 is a flowchart schematically showing a method of manufacturing a motor assembly shown in FIG. 4 and FIG. 8, and FIGS. 18 to 22 are conceptual diagrams showing a method of manufacturing a motor assembly shown in FIG. 17 in order.

Referring to FIG. 17, a method of manufacturing the motor assembly 100 shown in FIG. 4 and FIG. 8 may include a step S1701 of installing the first and second bearings 150 and 160 on the rotating shaft 110, a step S1703 of inserting the rotating shaft 110 in the bearing bracket 170/270 to enable the first and second bearings 150 and 160 to be seated on the bearing bracket 170/270, a step S1705 of inserting the elastic member 180' in the bearing bracket 170/270 to enable the first bearing 150 and the elastic member 180' to contact with each other, and a step S1707 of installing the separation preventing member 190/290 on the bearing bracket 170/270 to enable the elastic member 180' and the separating preventing member 190/290 to contact with each other.

After the separation preventing member 190/290 has been installed on the bearing bracket 170/270, the elastic member 180' is inserted between the first bearing 150 and the separating preventing member 190/290 so as to pressurize the first bearing 150 in a direction for the first and second bearings 150 and 160 to get closer to each other.

Figure 18:
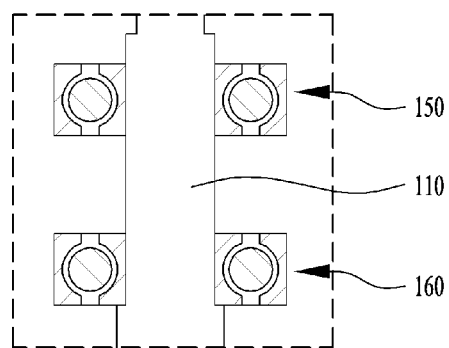
FIGS. 18 to 22 are conceptual diagrams showing a method of manufacturing a motor assembly shown in FIG. 17 in order.

Referring to FIG. 17 and FIG. 18 together, the first inner ring 151 of the first bearing 150 may be fixed to the first support part 112 of the rotating shaft 110 by press fitting, and the second inner ring 161 of the second bearing 160 may be fixed to the second support part 113 of the rotating shaft 110 by press fitting [S1701].

As described above, the first support part 112 and the second support part 113 may be located on the one side 110A of the rotating shaft 110 in a manner of being spaced apart from each other in a prescribed distance along the axial direction of the rotating shaft 110. Hence, the first and second bearings 150 and 160 may be installed on the one side 110A as well and disposed in a manner of being spaced apart from each other in a prescribed distance along the axial direction of the rotating shaft 110.

Figure 19:
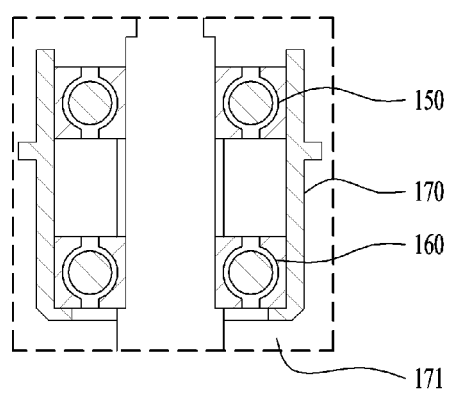

Referring to FIG. 17 and FIG. 19 together, before the elastic member 180 is installed in the bearing bracket 170, the rotating shaft 110 having the first and second bearings 150 and 160 installed thereon may be inserted and installed in the bearing bracket 170 [S1703].

In doing so, the first and second bearings 150 and 160 may be installed in the inner space of the bearing bracket 170, the first outer ring 152 of the first bearing 150 may be attached to the inner surface of the bearing bracket 170 through the adhesive agent, and the second outer ring 162 of the second bearing 160 may be fixed to the inner surface of the bearing bracket 170 by press fitting.

Figure 20:
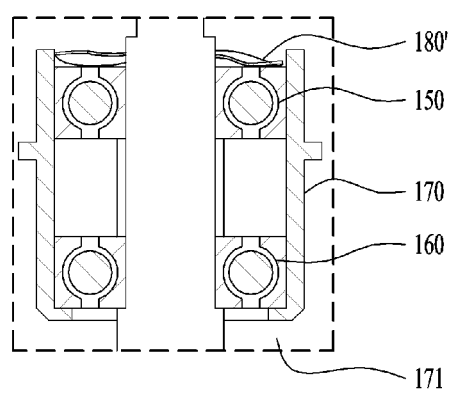

Referring to FIG. 17 and FIG. 20 together, in the state that the rotating shaft 110 having the first and second bearings 150 and 160 installed thereon is inserted and installed in the inner space of the bearing bracket 170, the elastic member 180' may be inserted in the bearing bracket 170, whereby the elastic member 180' and the first bearing 150 may contact with each other [S1705].

Figure 21:
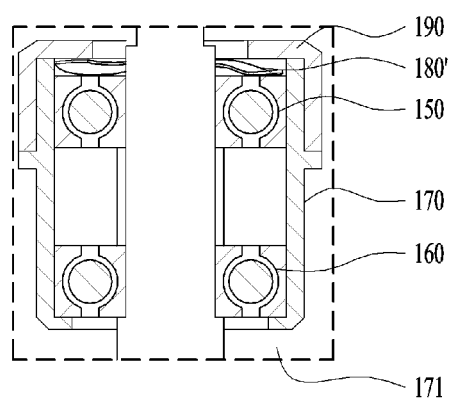

Referring to FIG. 17 and FIG. 21 together, in the state that the rotating shaft 110 having the first and second bearings 150 and 160 installed thereon and the elastic member 180' are installed, the separation preventing member 190 may be installed on the bearing bracket 170 so as to enable the separation preventing member 190 and the elastic member 180' to contact with each other [S1707].

Particularly, the separation preventing member 190 may be installed on the bearing bracket 170 to enclose the outer circumference of the bearing bracket 170. Moreover, at least one portion of the separation preventing member 190 may overlap with the outer ring 152 of the first bearing 150 along the axial direction of the rotating shaft 110. Hence, the first bearing 150 is fixed by the separation preventing member 190 using the elastic member 180' as a medium and seated within the bearing bracket 170 without being separated in the direction toward the impeller 120.

Figure 22:
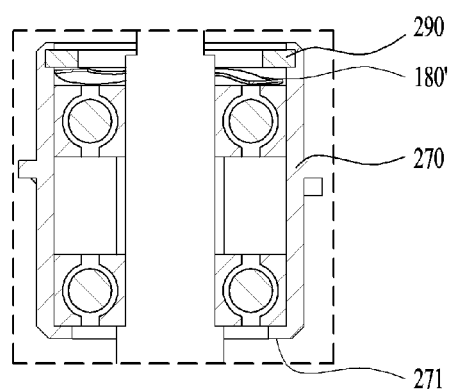

Meanwhile, referring to FIG. 17 and FIG. 22, although the step S1701 of installing the first and second bearings 150 and 160 on the rotting shaft 110, the step S1703 of inserting and installing the rotating shaft 110 having the first and second bearings 150 and 160 installed thereon in the bearing bracket, and the step 1705 of inserting the elastic member 180' in the bearing bracket 270 so as to contact with the first bearing 150 are the same, the bearing bracket 270 shown in FIG. 22 may further include an installation groove 272 recessed from the inner circumference of the bearing bracket 270 in a prescribed interval along a radial direction of the rotating shaft 110 unlike the former bearing bracket 170 shown in FIGS. 18 to 20.

Namely, while the rotating shaft 110 having the first and second bearings 150 and 160 installed thereon is inserted in the bearing bracket 270 having the installation groove 272 and the first outer ring 152 receives a pressurizing force from the elastic member 180' in a direction facing the second bearing 160, the separation preventing member 290 may be installed in the installation groove 272 in the compressed state (see 290C of FIG. 6B), thereby supporting the first bearing 150.

As described above, the separation preventing member 290 shown in FIG. 22 can be elastically deformed between the compressed state (290C of FIG. 6B) of being compressed by an externally applied force and the normal state (290S of FIG. 6A) of expanding from the compressed state 290C depending on an externally applied force.

Namely, the separation preventing member 290 in the compressed state 290C enters the bearing bracket 270, is seated on the installation groove 272, and then expands into the normal state 290S again, thereby being firmly fixed to the installation groove 272. The separation preventing member 290 installed in the installation groove 272 overlaps with the first outer ring 152 of the first bearing 150 along the axial direction of the rotating shaft 110 using the elastic member 180' as a medium, thereby fixing the elastic member 180' and the first outer ring 152 to the inside of the bearing bracket 170 in order to prevent the elastic member 180' and the first outer ring 152 from be separated out of the bearing bracket 270.

As described with reference to FIGS. 11 to 22, the motor assembly 100 according to one embodiment of the present disclosure does not support the other side 110B of the rotating shaft 110 with a separate bearing. Instead, according to one embodiment of the present disclosure, one side 110A of the rotating shaft 110 is eccentrically supported with two bearings 150 and 160 and appropriate pre-load is applied to the bearings 150 and 160 using the elastic member 180/180'. Thus, the downsizing and weight-lightening of the motor assembly 100 may be implemented and noise and vibration may be also reduced by improving the alignment between the two bearings 150 and 160.

As the two bearings 150 and 160 are received in the single bearing bracket 170/270 in a manner of being spaced apart from each other in a prescribed spacing along an axial direction of the rotating shaft 110, an overall structure of the motor assembly 100 may be simplified. Simultaneously, as the rotating shaft 110 can be stably supported, reliability and durability of the bearing structure may be secured.

In addition, as each of the two bearings 150 and 160 eccentrically supporting the rotating shaft 110 has an outer diameter D greater than an inner diameter d of the stator 140, sufficient bearing life may be secure by increasing sizes of the bearings.

Accordingly, in the eccentric support structure of the rotating shaft 110 by the first bearing 150, the second bearing 160 and the bearing bracket 170, the rotating shaft 110 may be stably supported without supporting the other side 110B of the rotating shaft 110 with a baring and the inter-bearing alignment may be improved by applying appropriate pre-load to the bearings 150 and 160. As a possible design consideration, enlarging the outer diameters D of the first and second bearings 150 and 160 means that the life of the bearing structure can be secured sufficiently.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

What is claimed is:

1. A motor assembly, comprising:
a rotating shaft;
an impeller mounted on the rotating shaft;
a rotor mounted on the rotating shaft and axially spaced apart from the impeller along a rotational axis of the rotating shaft;
a stator surrounding a circumferential surface of the rotor and spaced apart from the rotor radially relative to the rotational axis of the rotating shaft;
a first bearing mounted on the rotating shaft between the impeller and the rotor and configured to rotatably support a first support part of the rotating shaft;
a second bearing mounted on the rotating shaft between the impeller and the rotor and configured to rotatably support a second support part of the rotating shaft, wherein the first bearing is positioned closer to the impeller than the second bearing, and the second bearing is positioned closer to the rotor than the first bearing;
a bearing bracket that receives the first and second bearings therein;
an elastic member disposed between the first bearing and the bearing bracket or between the second bearing and the bearing bracket and biasing one of the first bearing and the second bearing toward the other of the first beating and the second bearing; and
a separation preventing holder mounted on an outer surface of the bearing bracket and fixing the first bearing, the second bearing and the elastic member within the bearing bracket such that at least a portion of the separation preventing holder covers at least one of the first bearing, the second bearing or the elastic member axially along the rotational axis of the rotating shaft, and such that the separation preventing holder covers at least a portion of the outer surface of the bearing bracket.

2. The motor assembly of claim 1, wherein the separation preventing holder is mounted on the bearing bracket and enclosing an outer circumference of the bearing bracket.

3. The motor assembly of claim 1, wherein the bearing bracket further comprises an installation groove recessed from an inner circumference of the bearing bracket, wherein the separation preventing holder is elastically deformable by an externally applied force, and wherein the separation preventing holder is engaged with the installation groove while the separation preventing holder is deformed.

4. The motor assembly of claim 3, wherein the separation preventing holder has a diameter equal to or smaller than a diameter of the inner circumference of the bearing bracket.

5. The motor assembly of claim 1, wherein an outer diameter of each of the first and second bearings is greater than an inner diameter of the stator.

6. The motor assembly of claim 1, wherein the first bearing comprises a first inner ring press-fit onto the first support part of the rotating shaft, a first outer ring contacting with an inner surface of the bearing bracket, and a first roll member disposed between the first inner ring and the first outer ring and rotatably supporting the first inner ring relative to the first outer ring and wherein the second bearing comprises a second inner ring press-fit onto the second support part of the rotating shaft, a second outer ring contacting with the inner surface of the bearing bracket, and a second roll member disposed between the second inner ring and the second outer ring and rotatably supporting the second inner ring relative to the second outer ring.

7. The motor assembly of claim 6, wherein one of the first outer ring and the second outer ring is press-fit onto the inner surface of the bearing bracket, and wherein the other is attached to the inner surface of the bearing bracket by an adhesive.

8. The motor assembly of claim 6, wherein the first roll member is configured to maintain contact with the first inner ring and the first outer ring based on the elastic member biasing one of the first outer ring and the second outer ring, and wherein the second roll member is configured to maintain contact with the second inner ring and the second outer ring based on the elastic member biasing the one of the first outer ring and the second outer ring.

9. A method of manufacturing a motor assembly, the method comprising:
mounting a first bearing on a rotating shaft;
mounting a second bearing on the rotating shaft;
inserting an elastic member in a bearing bracket;
inserting the rotating shaft having the first and second bearing mounted thereon in the bearing bracket such that the rotating shaft extends through the bearing bracket, the first and second bearings are seated on the bearing bracket, and the second bearing contacts with the elastic member; and
mounting a separation preventing holder on an outer surface of the bearing bracket such that at least a portion of the separation preventing holder covers the first bearing axially along a rotational axis of the rotating shaft and covers the outer surface of the bearing bracket,
wherein the elastic member is inserted between the second bearing and the bearing bracket to bias the second bearing toward the first bearing.

10. The method of claim 9, wherein mounting the separation preventing holder on the bearing bracket includes:
mounting the separation preventing holder on the bearing bracket to enclose an outer circumference of the bearing bracket.

11. The method of claim 9, wherein the bearing bracket further comprises an installation groove recessed from an inner circumference of the bearing bracket, and wherein the separation preventing holder is elastically deformable by an externally applied force, and
wherein the method comprises:
engaging the separation preventing holder with the installation groove while the separation preventing holder is deformed.

12. The method of claim 9, wherein the first bearing includes a first inner ring and the second bearing includes a second inner ring, and
wherein the method comprises:
press-fitting the first inner ring onto a first support part of the rotating shaft, and
press-fitting the second inner ring onto a second support part of the rotating shaft.

13. The method of claim 9, wherein the first bearing includes a first outer ring, and the second bearing includes a second inner ring, and wherein the method comprises:
press-fitting the first outer ring onto an inner surface of the bearing bracket, and
attaching the second outer ring to the inner surface of the bearing bracket by an adhesive agent.

14. The method of claim 13, wherein upon the elastic member biasing the second outer ring toward the first outer ring, the second outer ring of the second bearing is axially slidable along the inner surface of the bearing bracket during a predetermined time after the second outer ring is attached to the inner surface of the bearing bracket by the adhesive agent, and
wherein, after expiration of the predetermined time, the second outer ring is fixed to the inner surface of the bearing bracket.

15. A method of manufacturing a motor assembly, the method comprising:
mounting a first bearing on a rotating shaft;
mounting a second bearing on the rotating shaft;
inserting the rotating shaft having the first and second bearing installed thereon in a bearing bracket such that the rotating shaft extends through the bearing bracket and the first and second bearings are seated on the bearing bracket;
inserting an elastic member in the bearing bracket such that the first bearing contacts with the elastic member; and
mounting a separation preventing holder on the bearing bracket such that at least a portion of the separation preventing holder covers the elastic member axially along a rotational axis of the rotating shaft,
wherein the bearing bracket further comprises an installation groove recessed from an inner circumference of the bearing bracket, and wherein the separation preventing holder is elastically deformable by an externally applied force, and
wherein the method further comprises:
engaging the separation preventing holder with the installation groove while the separation preventing holder is deformed.

16. The method of claim 15, wherein the separation preventing holder is installed on the bearing bracket to enclose an outer circumference of the bearing bracket.

17. The method of claim 15, wherein inserting an elastic member in the bearing bracket comprises:
inserting the elastic member between the first bearing and the separation preventing holder to bias the first bearing toward the second bearing.

18. The method of claim 15, wherein the first bearing includes a first outer ring, and the second bearing includes a second outer ring, and
wherein the method comprises:
attaching the first outer ring to an inner surface of the bearing bracket by an adhesive agent; and
press-fitting the second outer ring to the inner surface of the bearing bracket.

19. The method of claim 18, wherein upon the elastic member biasing the first outer ring toward the second outer ring, the first outer ring of the first bearing is axially slidable along the inner surface of the bearing bracket during a predetermined time after the first outer ring is attached to the inner surface of the bearing bracket by the adhesive agent and
wherein, after expiration of the predetermined time, the first outer ring is fixed to the inner surface of the bearing bracket.

* * * * *